Sept. 29, 1936.  E. W. COLLINSON  2,056,122
SWEETMEAT
Filed Aug. 7, 1935
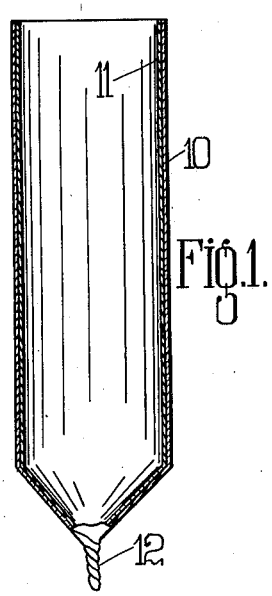
Inventor
Edward Whiteley Collinson
By Mason & Porter
Attorneys Patented Sept. 29, 1936

2,056,122

UNITED STATES PATENT OFFICE 2,056,122

SWEETMEAT

Edward Whiteley Collinson, Preston, England, assignor to Beech's Chocolates Limited, Preston, England, a British company Application August 7, 1935, Serial No. 35,178
In Great Britain July 18, 1934

4 Claims. (Cl. 99—180)

The present invention relates to sweetmeats.

By the present invention there is provided as an article of manufacture, a hollow shell of solid yet fragile edible material which is open at one end and has on its outer face a detachable covering of tearable non-edible material which is closed at one or both ends.

Further by the present invention there is also produced as an article of manufacture, a hollow cylindrical shell of solid yet fragile edible material which is open at one end and has an insert consisting of an iced or other confection, whilst an outer detachable covering of metal foil is closed over said cylindrical shell at one or both ends.

One method of preparing a sweetmeat according to this invention consists of forming a cylindrical covering of tearable non-edible material, applying to the inner wall of said covering a coating of edible material when in the form of a liquid, and finally cooling said liquid so that it takes up a solid form similar to its enclosing covering.

Another method of preparing sweetmeats according to the present invention consists in forming a rigid shell of edible material which is open at one or both ends, applying a wrapping of foil or the like non-edible tearable material to the outer face of said shell and then folding over one or both ends of a wrapper, such as of tin foil or the like, to partly or wholly enclose said shell.

With either method of operation the iced or other confection such as marshmallow may be inserted within the coating or shell of edible material at any desired period of time after the methods described.

The covering of tearable non-edible material when the edible material in liquid form is applied to the inner wall thereof, or again the wrapper where the edible material is premoulded and the wrapper applied to the outer face of the moulded edible material, whilst preferably being of tin foil may be of grease-proof paper or of any other material so long as it is tearable and readily removable from the edible shell or coating for human consumption after the coating or shell has been hardened and received its insert of iced or other confection and if desired a snip may be taken out of the top edge of the cover or wrapper to permit tearing to be commenced without difficulty. Again, the cover or wrapper as the case may be, is preferably twisted at one end to form the base of the shell so that the article may be held in the hand without softening the material forming the shell.

In carrying out the method of operation wherein the edible material such as liquid chocolate is applied to the inner face of the covering of non-edible material, a sheet of aluminium or tin foil or again of grease-proof paper, is shaped into hollow cylindrical form whereupon one end is twisted to close the cylinder at that end as the other end is left open. The open-ended cylinder of foil or paper is then inserted within a rotary mould having an internal cylindrical shape and preferably formed of two half portions whereupon the mould is rotated about its own axis and a charge of liquid chocolate on a plunger is inserted within the mould. The plunger is then rotated about its own axis by any desired means to cause the liquid chocolate under the action of centrifugal force to leave the plunger and be applied to the inner wall of the foil or paper whereupon the plunger is withdrawn.

Any desired mechanism may be employed whereby rotation of the plunger commences when the plunger takes up a predetermined position within the mould and whereby the rotation of the plunger ceases immediately this is withdrawn from said predetermined position.

After withdrawal of the plunger the mould continues to rotate until the deposited chocolate has congealed whereupon the mould is stopped and the mould together with the internal coating of chocolate on the foil or paper cover is removed to a cooling chamber.

After a predetermined interval of time the foil is removed from the mould with chocolate in solid form adhering to the inner face of the foil.

The product by this time is an article of manufacture capable of being sold for example to ice cream manufacturers for the purpose of inserting ice cream within the shell and the covering. When the ice cream has hardened within the chocolate coated covering, the covering may be removed leaving the chocolate adhering to the ice cream.

The moulds may be arranged in batteries located in close proximity to a cooling or refrigerating chamber and with a conveyor passing between the batteries the foil covers being placed on pins carried by the conveyor to be brought into close proximity to the moulds, whereupon they are removed and inserted in the moulds so that chocolate may be applied thereto.

Further, the moulds may be mounted on a spinning frame with the refrigerating chamber on top of this so that when a number of moulds have received their charge of chocolate they may be readily removed and mounted in position in holes formed in the upper wall of the refrigerating chamber for cooling purposes. While cooling is being effected another battery of moulds may be inserted in position on the spinning frame and the process repeated.

To illustrate the product and for the purpose of particularly describing the nature of the invention, reference is made to the accompanying drawing, in which:—

Figure 1 is a sectional elevation of said product.
Figure 2 is a plan view thereof.

In the drawing an outer cylindrical covering of aluminium foil or paper is shown at 10 and an internal coating of chocolate or other edible material at 11. The outer covering is twisted upon itself at 12 to close one end of the cylinder and to constitute means for handling the product without danger of melting the chocolate due to contact with the hands of the user or consumer.

In the drawing the coating of chocolate 11 is shown as reaching to the upper end of the covering 10, but if desired, it may stop short of this upper end to permit the cover to be twisted or turned in at the open end at such time after an insert of ice cream or marshmallow for example, has been applied to the chocolate shell 11.

In a modified form of construction the shell of chocolate may be pre-moulded to a hollow cylindrical form having one or both ends open. This may be accomplished by any of the desired known methods.

After the chocolate has been thoroughly set and hardened a wrapper of tin foil, grease-proof paper or the like is applied to the shell and twisted at one end as shown in the drawing. Here again the length of the wrapper may be greater than the axial length of the cylindrical chocolate shell so that after an iced or other confection such as marshmallow has been inserted within the shell the opposite end of the wrapper may be twisted to completely enclose both the chocolate shell and the confection insert.

Again the base of the cylindrical chocolate shell, where one end is closed, may be flat, conical, inverted conical or of any other suitable shape such as concave or convex for example.

I declare that what I claim is:—

1. A method of preparing sweetmeats consisting in forming a cylindrical covering of tearable non-edible material having one end thereof closed, rotating said covering, inserting within said covering a plunger charged with an edible liquid, rotating said plunger to apply a coating of said edible liquid on the inner wall of said covering under the action of centrifugal force, withdrawing said plunger while said covering continues to rotate whereby to cool the liquid coating and to maintain its shape on said covering, terminating the rotation of said covering when the coating has solidified, and applying a charge of confection internally of said coated covering.

2. A method of preparing sweetmeats consisting in forming a cylindrical covering of tearable non-edible material having one end thereof closed, applying a coating of an edible liquid on the inner wall of said covering under the action of centrifugal force, rotating said covering after the edible coating has been applied whereby to cool the liquid and form a solid coating similar in shape to the closing cover and inserting a charge of confection within the edible coating.

3. A method of preparing sweetmeats consisting in forming a cylindrical covering of tearable non-edible material having one end thereof closed, applying a coating of an edible liquid on the inner wall of said covering under the action of centrifugal force, rotating said covering after the edible coating has been applied whereby to cool the liquid and form a solid coating similar in shape to the closure cover, inserting a supply of confection within said edible coating, and folding over the open end of said non-edible cover to complete the closure for the contents.

4. A method of preparing an edible shell for a confection consisting in forming a cylindrical covering of tearable non-edible material having one end thereof closed, applying a coating of an edible liquid on the inner wall of said cover under the action of centrifugal force, rotating said covering after the edible coating has been applied whereby to cool the liquid and form a solid coating similar in shape to the closure member.

EDWARD WHITELEY COLLINSON.